United States Patent
Kobayashi et al.

(10) Patent No.: US 7,259,707 B2
(45) Date of Patent: Aug. 21, 2007

(54) SEMICONDUCTOR DEVICE WITH A/D CONVERTER

(75) Inventors: Keiko Kobayashi, Yamagata (JP); Yoichi Takahashi, Yamagata (JP); Tomotake Ooba, Yamagata (JP); Fujio Higuchi, Yamagata (JP); Keiichi Iwazumi, Yamagata (JP); Akira Saitou, Yamagata (JP)

(73) Assignee: NEC Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 11/248,158

(22) Filed: Oct. 13, 2005

(65) Prior Publication Data

US 2006/0082485 A1 Apr. 20, 2006

(30) Foreign Application Priority Data

Oct. 14, 2004 (JP) ............................. 2004-300725

(51) Int. Cl.
*H03M 1/12* (2006.01)

(52) U.S. Cl. ....................................... 341/155; 341/119

(58) Field of Classification Search ................ 341/118, 341/120, 155, 119
See application file for complete search history.

(56) References Cited

U.S. PATENT DOCUMENTS

| | | | | |
|---|---|---|---|---|
| 3,851,190 A | * | 11/1974 | Hongu et al. ................ | 327/333 |
| 4,165,478 A | * | 8/1979 | Butler et al. ................ | 323/270 |
| 4,505,600 A | * | 3/1985 | Suzuki et al. ................ | 374/170 |
| 4,627,740 A | * | 12/1986 | Jerde et al. ..................... | 374/1 |
| 6,183,131 B1 | * | 2/2001 | Holloway et al. .......... | 374/172 |
| 6,307,496 B1 | * | 10/2001 | Ikuta et al. ................. | 341/155 |
| 7,029,171 B2 | * | 4/2006 | Tesi et al. ....................... | 374/1 |

FOREIGN PATENT DOCUMENTS

| | | |
|---|---|---|
| JP | 02-227625 | 9/1990 |
| JP | 05-187935 | 7/1993 |
| JP | 6-243549 | 9/1994 |
| JP | 09-219629 | 8/1997 |
| JP | 2000-295051 | 10/2000 |
| JP | 2004-237951 | 8/2004 |

OTHER PUBLICATIONS

Japanese Office Action dated Apr. 25, 2007 with a partial English translation.

* cited by examiner

*Primary Examiner*—Peguy JeanPierre
(74) *Attorney, Agent, or Firm*—McGinn IP Law Group, PLLC

(57) ABSTRACT

A semiconductor device includes a reference voltage generating section configured to generate a first reference voltage and a second reference voltage based on a voltage supplied from an external power supply, and an AD (analog/digital) conversion circuit operating based on the first reference voltage to generate an AD conversion signal corresponding to an output signal supplied from an external device. The second reference voltage is supplied to the external device, and a ratio of the first reference voltage and the second reference voltage is kept to a constant value regardless of a temperature of the semiconductor device.

12 Claims, 13 Drawing Sheets

10:TPMS(Tire Pressure Monitoring System)

Fig. 10

| 70 | | 71 SENSOR VOLTAGE | 72 REFERENCE VOLTAGE | 73 SENSOR OUTPUT VOLTAGE | 74 Vain (FACTOR OF 30) | 75 AD CONVERSION VALUE |
|---|---|---|---|---|---|---|
| | typical | 1.0V | 2.0V | 10mV | 0.3V | 0.3V/2.0V*1024 =0.15*1024 =154 |
| | | 1.0V | 2.2V | 10mV | 0.3V | 0.3V/2.2V*1024 =0.136*1024 =139 |
| | | 1.0V | 1.8V | 10mV | 0.3V | 0.3V/1.8V*1024 =0.167*1024 =171 |

Fig. 11

| | SENSOR VOLTAGE | REFERENCE VOLTAGE | SENSOR OUTPUT VOLTAGE | Vain (FACTOR OF 30) | AD CONVERSION VALUE |
|---|---|---|---|---|---|
| typical | 1.0V | 2.0V | 10mV | 0.3V | 0.3V/2.0V*1024<br>=0.15*1024<br>=154 |
| | 1.1V | 2.2V | 11mV | 0.33V | 0.33V/2.2V*1024<br>=0.15*1024<br>=154 |
| | 0.9V | 1.8V | 9mV | 0.27V | 0.27V/1.8V*1024<br>=0.15*1024<br>=154 |

SEMICONDUCTOR DEVICE WITH A/D CONVERTER

BACKGROUND OF THE INVENTION

1. Field of the Invention

The present invention relates to a semiconductor device, and in particular, relates to a semiconductor device for converting an analog signal into digital data and outputting the digital data.

2. Description of the Related Art

In recent years, regulation for the safety of vehicles has been enhanced in succession in Japan and the United States. According to the TREAD Act (Transportation Recall Enhancement, Accountability and Document Act) enforced in North America, new automobiles sold in and after the year 2006 are obligated to be equipped with an automobile tire-pressure monitoring system. For this reason, a technique for mounting a sensor in a tire is presently developed to measure a pneumatic pressure and a temperature. The technique is a system for mounting a sensor unit in a valve section of the tire and monitoring all four tires individually. Therefore, it is possible to carry out monitoring with a high accuracy, and there is a merit that the monitoring of the tire pressure can be carried out even when an automobile is in a stop.

The sensor unit mounted to the tire is provided with a pressure sensor for outputting an analog voltage signal in response to the tire pressure and a semiconductor device for converting the analog voltage signal outputted from the pressure sensor into a digital signal and outputting the digital signal. In general, such a semiconductor device has an AD conversion circuit to convert an analog signal into a digital signal. Usually, a predetermined voltage is supplied from a power supply for the sensor to the pressure sensor. The pressure sensor generates the analog voltage signal by use of the supplied voltage, and supplies the generated analog voltage signal to the semiconductor device. The AD conversion circuit is connected to a power supply for supplying a reference voltage, and a constant voltage is supplied from the reference voltage supply. The AD conversion circuit converts the analog signal outputted from the pressure sensor into the digital signal by use of the reference voltage supplied from the reference voltage supply, as described in Japanese Laid Open Patent Application (JP-A-Heisei, 6-243549) as a conventional example.

When the pneumatic pressure of the tire mounted to a vehicle is measured, the sensor unit is generally provided for the valve section of the tire and so on, to measure the tire pressure. The temperature of the tire is different in case that the vehicle is running and in case that the vehicle is in a stop. That is, the temperature of the tire of the vehicle on running is increased due to friction with a road surface, compared with the vehicle in a stop. If the temperature of the tire is increased, the temperature of the sensor unit mounted to the valve section of the tire is increased, too.

FIG. 1 is a block diagram showing a configuration of a tension measuring circuit as a semiconductor device described in the above conventional example. The tension measuring circuit is configured from a sensor unit 110, a control unit 120, an amplifier unit 106, and an AD conversion 108. As shown in FIG. 1, a direct-current power supply 134 is connected to the sensor unit 110.

If the temperature changes, a voltage outputted from a battery varies. When a battery connected to the pressure sensor and a battery connected to the AD conversion circuit have different temperatures and discharging characteristics, the voltage of the battery connected to the pressure sensor varies. For this reason, the reference voltage supplied to the AD conversion circuit varies. Therefore, an output value from the AD conversion circuit deviates from a correct value since each variation characteristic is different. As a result, the pressure applied to the pressure sensor cannot be correctly outputted. In order prevent variation of the power supply voltages for the sensor and the reference voltage, a technique for providing a power supply circuit of high accuracy is known. That is, a temperature change in the sensor unit can be dealt with by providing the power supply circuit in which an output voltage does not easily shifted for the temperature change.

However, such a power supply circuit of high accuracy is generally expensive. Therefore, provision of the power supply circuit of high accuracy leads to the increase in manufacturing costs of the semiconductor device. In addition, the power supply circuit of high accuracy generally has a large circuit area. As a result, the circuit area of the semiconductor device provided with such a power supply also increases.

A semiconductor device capable of outputting appropriate data in correspondence to the voltage variation is demanded even when the reference voltage of the AD conversion circuit shifts due to the effect of the temperature change around the circuit and so on. Further, a technique is desired, for forming a semiconductor device that is difficult to receive the effect of the voltage variation, without causing the increase in the manufacturing costs and the circuit area.

SUMMARY OF THE INVENTION

In an aspect of the present invention, a semiconductor device includes a reference voltage generating section configured to generate a first reference voltage and a second reference voltage based on a voltage supplied from an external power supply; and an AD (analog/digital) conversion circuit operating based on the first reference voltage to generate an AD conversion signal corresponding to an output signal supplied from an external device through AD conversion. The second reference voltage is supplied to the external device, and a ratio of the first reference voltage and the second reference voltage is kept to a constant value regardless of a temperature of the semiconductor device.

Here, the reference voltage generating section may include an internal reference voltage generating circuit configured to generate the first reference voltage based on the voltage supplied from the external power supply; and an external reference voltage generating circuit configured to generate the second reference voltage from the first reference voltage such that the ratio is kept.

Also, the semiconductor device may further include an amplifying circuit provided between the external device and the AD conversion section and configured to amplify the output signal supplied from the external device to output an amplification signal. The AD conversion circuit carries out the AD conversion to the amplification signal based on the second reference voltage to generate the AD conversion signal. In this case, the reference voltage generating section may further generate a third reference voltage from the first reference voltage. The amplifying circuit may include an operational amplifier; and a bias control circuit configured to apply a bias voltage to an input terminal of the operational amplifier based on the third reference voltage in response to a control signal.

Also, the reference voltage generating section may include two voltage follower circuits configured to supply the first and second reference voltages to the AD conversion circuit and the external device, respectively.

Also, the semiconductor device may further include a microcomputer configured to temporarily store the AD conversion signal and output the AD conversion signal as a digital data signal.

In another aspect of the present invention, a data communication apparatus includes a sensor; and a semiconductor device configured to generate a digital data signal based on an output signal which is outputted from the sensor. The semiconductor device includes an amplifying circuit configured to amplify the output signal outputted from the sensor to generate an amplification signal; an AD (analog/digital) conversion circuit configured to carry out AD conversion to the amplification signal from the amplifying circuit to generate an AD conversion signal; a microcomputer configured to generate the digital data signal based on the AD conversion signal; and a reference voltage generating section configured to generate first and second reference voltages from a voltage supplied from a power supply, and to supply the first and second reference voltages to the AD conversion circuit and the sensor. A ratio of the first reference voltage and the second reference voltage is kept to be constant regardless of temperature of the semiconductor device.

Here, the reference voltage generating section may include an internal reference voltage generating circuit configured to generate the first reference voltage based on the voltage supplied from the power supply; and an external reference voltage generating circuit configured to generate the second reference voltage from the first reference voltage such that the ratio is kept.

Also, the reference voltage generating section further generates a third reference voltage from the first reference voltage. The amplifying circuit may include an operational amplifier; and a bias control circuit configured to apply a bias voltage to an input terminal of the operational amplifier based on the third reference voltage in response to a control signal.

Another aspect of the present invention relates to a data communication apparatus used for a TPMS (Tire Pressure Monitoring System) and provided to a tire. The data communication apparatus includes a pressure sensor configured to detect a pneumatic pressure of the tire; and a semiconductor device configured to generate pneumatic pressure data based on a sensor signal outputted from the pressure sensor. The semiconductor device has the same configuration as described above.

Another aspect of the present invention relates to a vehicle having tires. The vehicle includes a data communication unit provided for each of the tires; and a control unit configured to receive a pneumatic pressure data transmitted from the data communication unit. The data communication unit is similar to the above data communication apparatus.

Here, the reference voltage generating section may include an internal reference voltage generating circuit configured to generate the first reference voltage based on the voltage supplied from the power supply; and an external reference voltage generating circuit configured to generate the second reference voltage from the first reference voltage such that the ratio is kept.

Also, the reference voltage generating section may further generate a third reference voltage from the first reference voltage. The amplifying circuit may include an operational amplifier; and a bias control circuit configured to apply a bias voltage to an input terminal of the operational amplifier based on the third reference voltage in response to a control signal.

In another aspect of the present invention, a data outputting method is achieved by (a) generating a first reference voltage; by (b) generating a plurality of reference voltages which have a same temperature dependence as the first reference voltage in a predetermined temperature range, a first reference voltage of the a plurality of reference voltages being supplied to a sensor; and by (c) generating a sensor data from an output signal outputted from the sensor through AD (analog/digital) conversion by using a second reference voltage of the plurality of reference voltages.

Here, the (a) generating may be achieved by generating the reference voltage based on a voltage supplied from a power supply.

Also, the (b) generating may be achieved by generating the plurality of reference voltages through voltage division at a predetermined ratio.

Also, the (c) generating may be achieved by outputting an output signal from the sensor based on the first reference voltage; by amplifying the output signal to generate an amplification signal; and by carrying out the AD conversion to the amplification signal based on to the second reference voltage to generate the sensor data.

BRIEF DESCRIPTION OF THE DRAWINGS

FIG. 10 is a table in case that the present invention is not applied;

FIG. 11 is a table in case that the present invention is applied;

DESCRIPTION OF THE PREFERRED EMBODIMENTS

Hereinafter, a semiconductor device with an AD (analog/digital) converter of the present invention will be described in detail with reference to the attached drawings. In the embodiments described below, the semiconductor device of the present invention is applied to an automobile tire-pressure monitoring system, or TPMS (Tire Pressure Monitoring Systems). However, the present invention is not limited to this example.

First Embodiment

Figure 1:
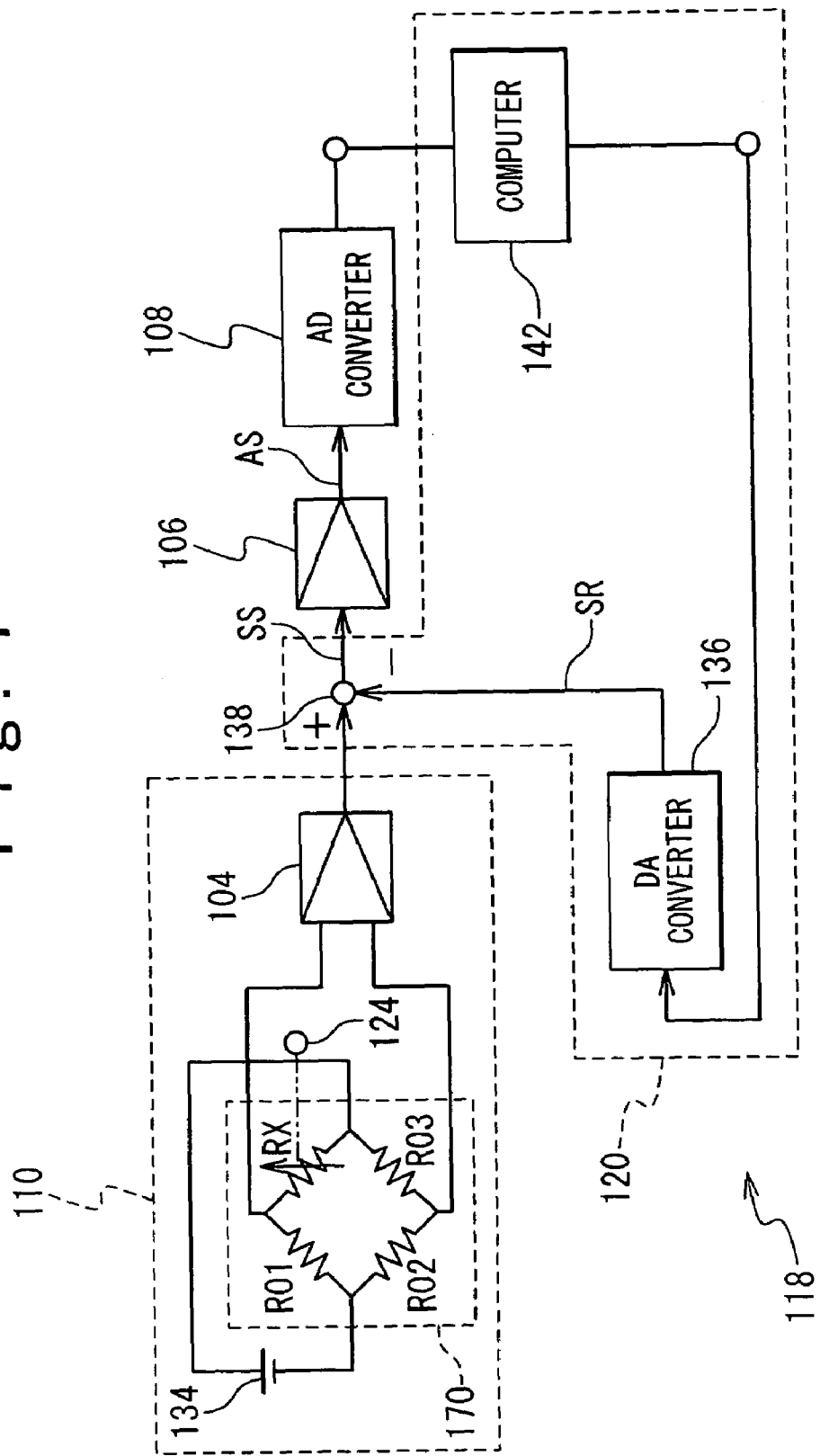
FIG. 1 is a block diagram showing the configuration of a conventional semiconductor device.
Figure 2:
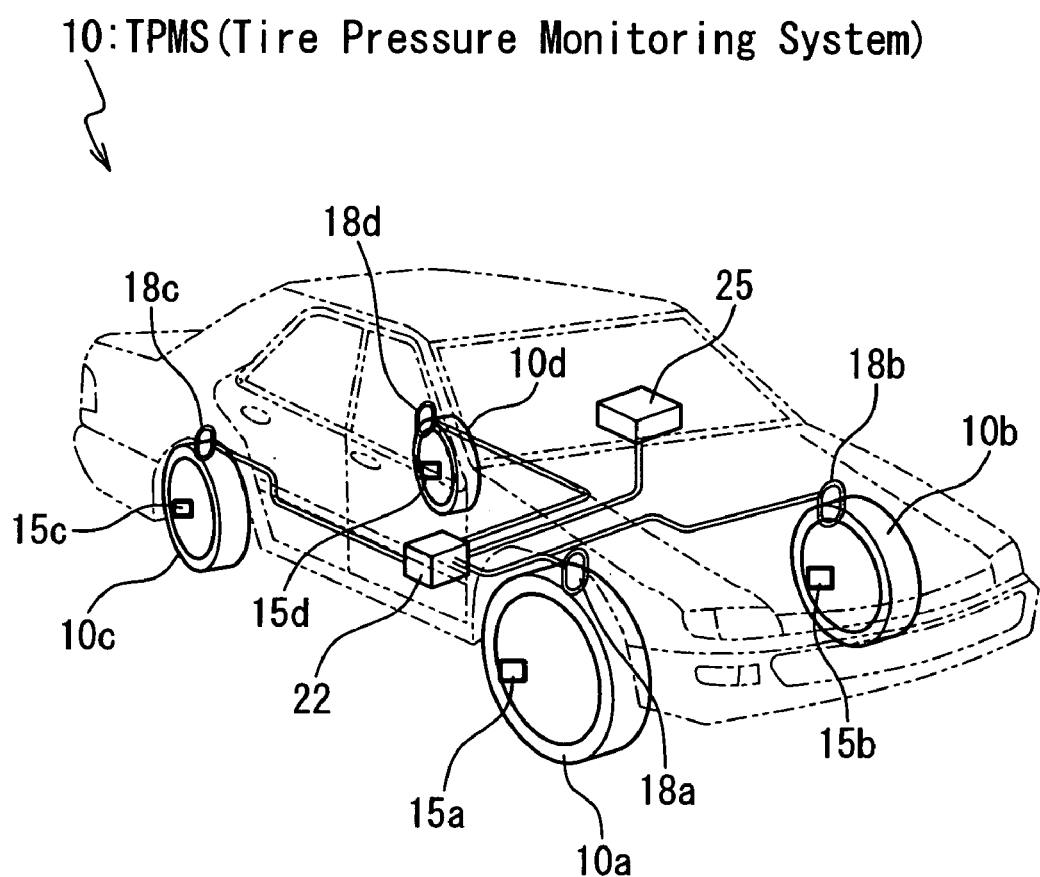
FIG. 2 is a diagram showing the outline configuration of a TPMS (Tire Pressure Monitoring System) of the present invention.

First, the TPMS (Tire Pressure Monitoring System) is provided with a data communication apparatus having the semiconductor device according to first embodiment of the present invention, and a schematic configuration of the TPMS will described with reference to FIG. 2.

A TPMS 10 is formed of sensor communication modules 15a to 15d mounted to tire wheels as the data communication modules, and sensor initiators 18a to 18d and a communication control module 22 provided on the side of a vehicle body. The sensor communication modules 15a to 15d have several types of sensors for detecting a pressure, a temperature, and so on; transmission units 16a to 16d for transmitting data signals obtained from the above sensors to the communication control module 22 by RF (radio frequency) electromagnetic waves; and reception units for receiving a command data signal transmitted from the communication control module 22 through the sensor initiators 18a to 18d by LF (Low Frequency) electromagnetic waves. The communication control module 22 has a reception function to receive RF electromagnetic wave transmitted from Key Less Entry and so on, in addition to a function to receive the data signals transmitted from the sensor communication modules 15a to 15d.

Figure 3:
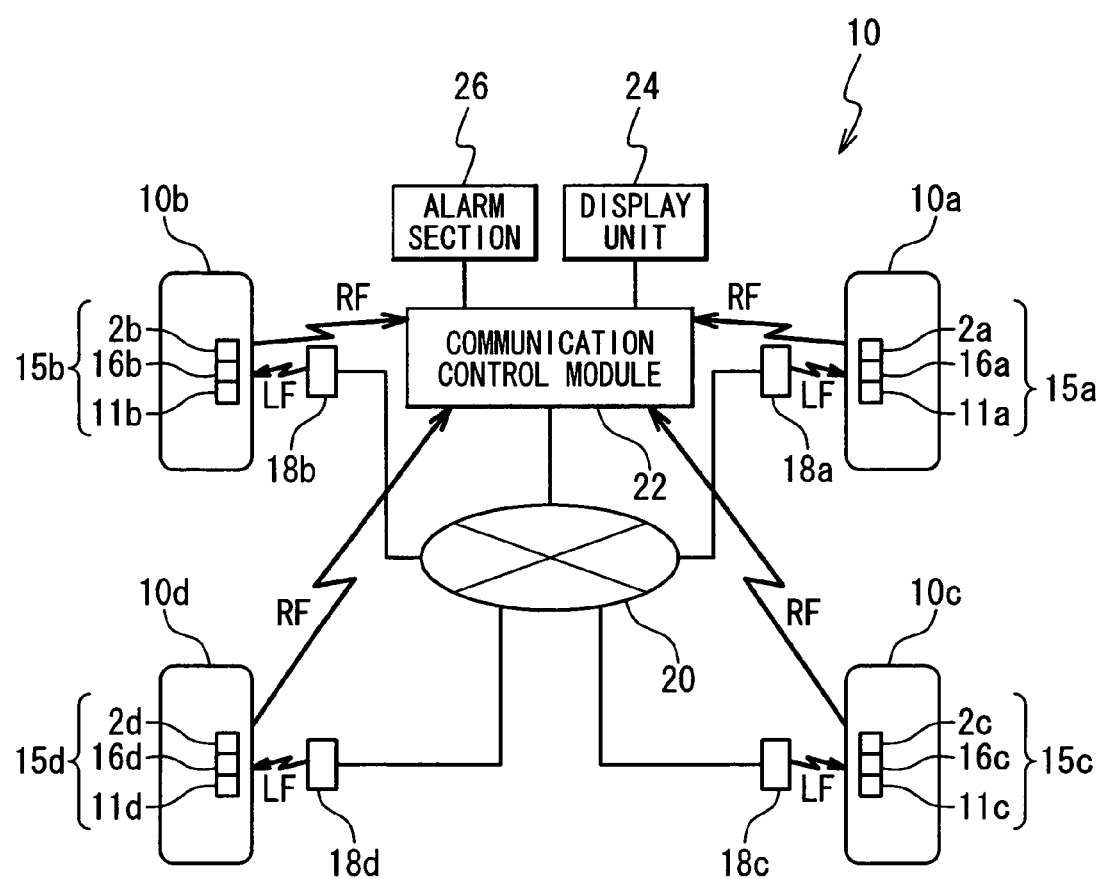
FIG. 3 is a block diagram showing the TPMS of the present invention.
Figure 4:
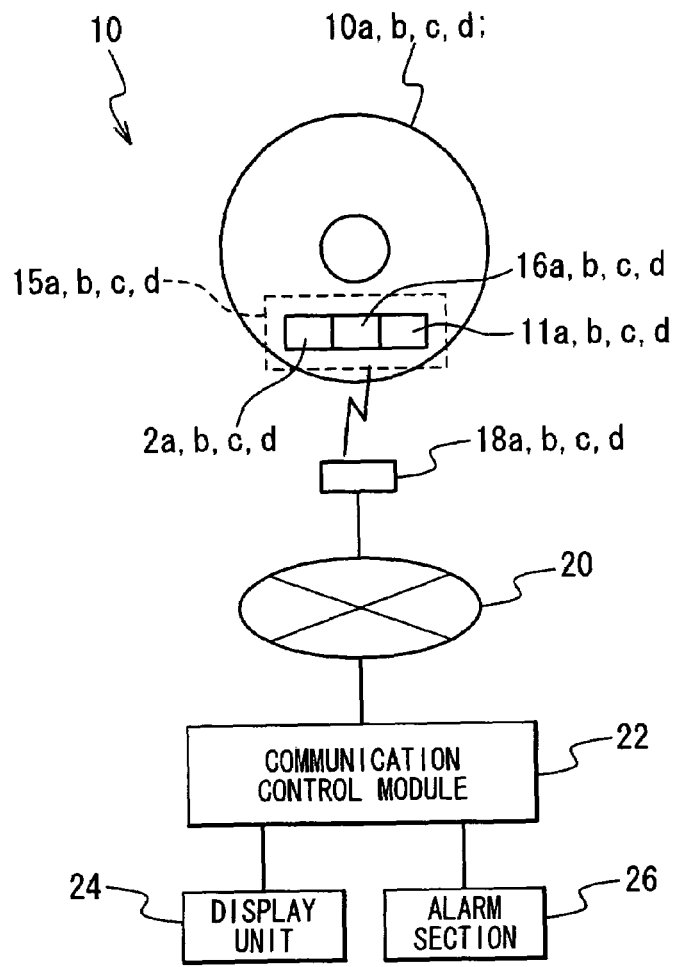
FIG. 4 is a block diagram of the TPMS of the present invention.
Figure 5:
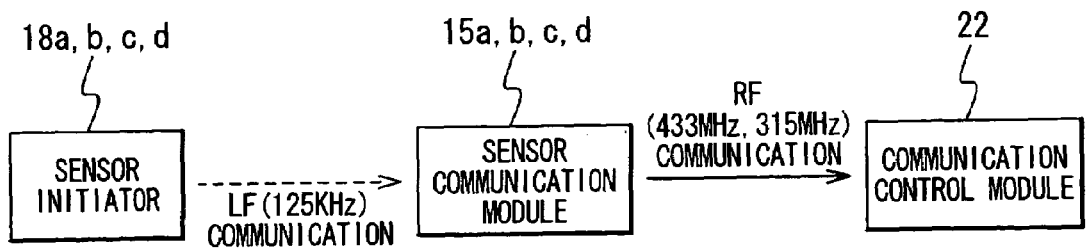
FIG. 5 is a diagram showing a radio communication route in the TPMS of the present invention.

FIGS. 3 and 4 show system block diagrams of the TPMS 10 in the first embodiment of the present invention. In FIG. 5, a radio communication route in the TPMS 10 in the first embodiment of the present invention is shown.

With reference to FIGS. 3 to 5, the sensor communication modules 15a to 15d of the TPMS 10 in the first embodiments are mounted to all tires 10a to 10d, respectively. The sensor communication modules 15a to 15d have pressure sensors 2a to 2d, temperature sensors 11a to 11d, and the transmission units 16a to 16d for transmitting measurement data obtained from the above sensors to the communication control module 22 through the sensor initiators 18a to 18d by the RF electromagnetic waves.

When a driver gets in an automobile, the RF electromagnetic wave for the Key Less Entry is transmitted to the communication control module 22 through an operation of the driver. If the RF electromagnetic wave for the Key Less Entry is received by the communication control module 22, a command signal for notifying start-up is transmitted from the communication control module 22 through an in-vehicle LAN 20 to the sensor initiators 18a to 18d. The sensor initiators 18a to 18d start up the sensor communication modules 15a to 15d by the LF electromagnetic waves in response to the command signal. If the sensor communication modules 15a to 15d are started up, the pneumatic pressure and temperature of the tire are immediately measured by the respective sensors provided to the sensor communication modules 15a to 15d. Then, data obtained through the measurement is supplied as the data signal into the communication control module 22 mounted on the side of the vehicle body by the transmission units 16a to 16d by the RF electromagnetic waves (433 MHz, 315 MHz). Based on the received data signal, the communication control module 22 notifies the driver of tire pressure data by a display section 25 (a display unit 24, an alarm unit 26, and so on).

When the running of the vehicle is detected by a running detector mounted to the tire (not shown) if the automobile starts running, the data signals obtained from the pressure sensors 2a to 2d and the temperature sensors 11a to 11d are transmitted to the communication control module 22 from the transmission units 16a to 16d in the sensor communication modules 15a to 15d by the RF electromagnetic wave to indicate the pneumatic pressure and temperature data of the tire and so on, in a specific time interval, or when the pneumatic pressure change and the temperature change in the tire become equal to or grater than threshold values. Then, the data signals transmitted to the communication control module 22 are subjected to predetermined arithmetic processing and sent to the display unit 24 and the alarm unit 26 through the in-vehicle LAN 20. Thus, the driver is notified of the pneumatic pressure and temperature information of the tire and so on.

Figure 6:
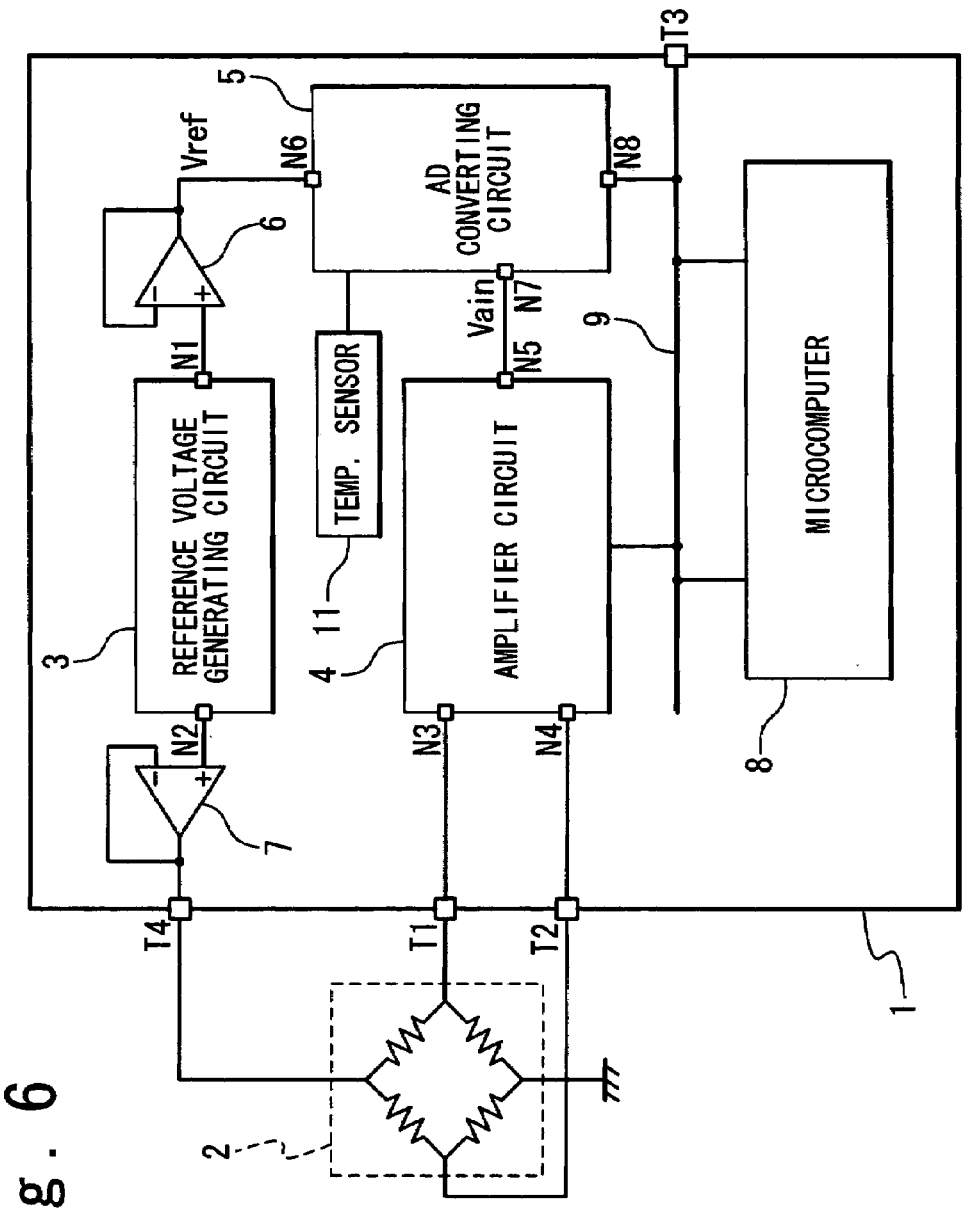
FIG. 6 is a block diagram showing the configuration of a semiconductor device according to a first embodiment of the present invention.

Each of the sensor communication modules 15a to 15d is configured to contain the semiconductor device 1 and a pressure sensor 2. FIG. 6 is a block diagram showing a configuration of the semiconductor device 1 according to the first embodiment of the present invention. The semiconductor device 1 in the first embodiment is provided to each of the sensor communication modules 15a to 15d. The pressure sensor 2 shown in FIG. 6 is a pneumatic pressure sensor for detecting the tire pressure. The pressure sensor 2 is provided to the tire, and outputs a signal as sensor output in response to the tire pressure. As shown in FIG. 6, the semiconductor device 1 has a terminal T1 and a terminal T2 for receiving voltage signals outputted from the pressure sensor 2. The semiconductor device 1 amplifies the voltage signals received through the terminals T1 and T2 to generate an amplification signal. The semiconductor device 1 carries out the AD conversion to the amplification signal to generate an AD conversion value (digital signal). Further, the semiconductor device 1 generates pneumatic pressure data based on the AD conversion value to output through an output terminal T3.

As shown in FIG. 6, the semiconductor device 1 is configured to contain a reference voltage generating circuit 3, an amplifier circuit 4, an AD conversion circuit 5, a microcomputer 8, and a temperature sensor 11. The reference voltage generating circuit 3 is a voltage generating circuit of the present invention. The reference voltage generating circuit 3 generates a reference power supply voltage to be supplied to the AD conversion circuit 5 through a voltage follower 6. At the same time, the reference voltage generating circuit 3 generates sensor power supply voltage to be supplied to the pressure sensor 2. As shown in FIG. 6, the reference voltage generating circuit 3 has a node N1 and a node N2. The reference power supply voltage outputted from the node N1 is supplied to the AD conversion circuit 5 through the voltage follower 6. At the same time, the sensor power supply voltage outputted from the node N2 is outputted to the sensor through a voltage follower 7 and a terminal T4. The voltage followers 6 and 7 mentioned above carries out buffering to avoid an influence to the power supply side.

The amplifier circuit 4 has a node N3 and a node N4, and receives the voltage signals supplied from the pressure sensor 2 through the node N3 and the node N4. The amplifier circuit 4 amplifies the difference between the voltage signals supplied from the pressure sensor 2. A voltage difference signal (analog signal) amplified by the amplifier circuit 4 is supplied to the AD conversion circuit 5 through a node N5. A specific circuit configuration of the amplifier circuit 4 is described later.

The AD conversion circuit 5 is a circuit for converting the analog signal supplied from the amplifier circuit 4 into the digital signal. In the embodiment described below, description is given on the assumption that the AD conversion circuit 5 is an AD conversion circuit having 10 bits resolution. However, this does not limit the resolution of the AD conversion circuit of the present invention. The AD conversion circuit 5 receives the voltage difference signal supplied from the amplifier circuit 4 through a node N7. The AD conversion circuit 5 carries out the AD conversion to the voltage difference signal, to outputs to the microcomputer 8 through a node N8. In addition, the AD conversion circuit 5 also carries out the AD conversion of a voltage signal outputted from the temperature sensor 11.

The microcomputer 8 is an integrated circuit provided to the semiconductor device 1. The microcomputer 8 calculates the pneumatic pressure or temperature of the tire based on the digital signal supplied from the AD conversion circuit 5. The microcomputer 8 outputs the calculated pneumatic pressure from a terminal T3 as a pneumatic pressure data signal. The pneumatic pressure data signal outputted from the terminal T3 is transmitted to the communication control module 22 from each of the sensor communication modules 15a to 15d by the RF electromagnetic wave. It is preferable that the microcomputer 8 shown in FIG. 6 is configured to have a memory and a CPU. The memory is a storage device capable of reading/writing of data. Description is given on the assumption that the memory in the embodiment is a RAM (Random Access Memory). However, this does not limit the configuration of the memory in the present invention. For example, it is also possible that the memory is formed by a nonvolatile memory such as an EEPROM. The CPU is an arithmetic and logical processing unit provided to the microcomputer 8. The CPU carries out control of various sections provided to the semiconductor device 1 and processing of data received through a bus 9.

Figure 7:
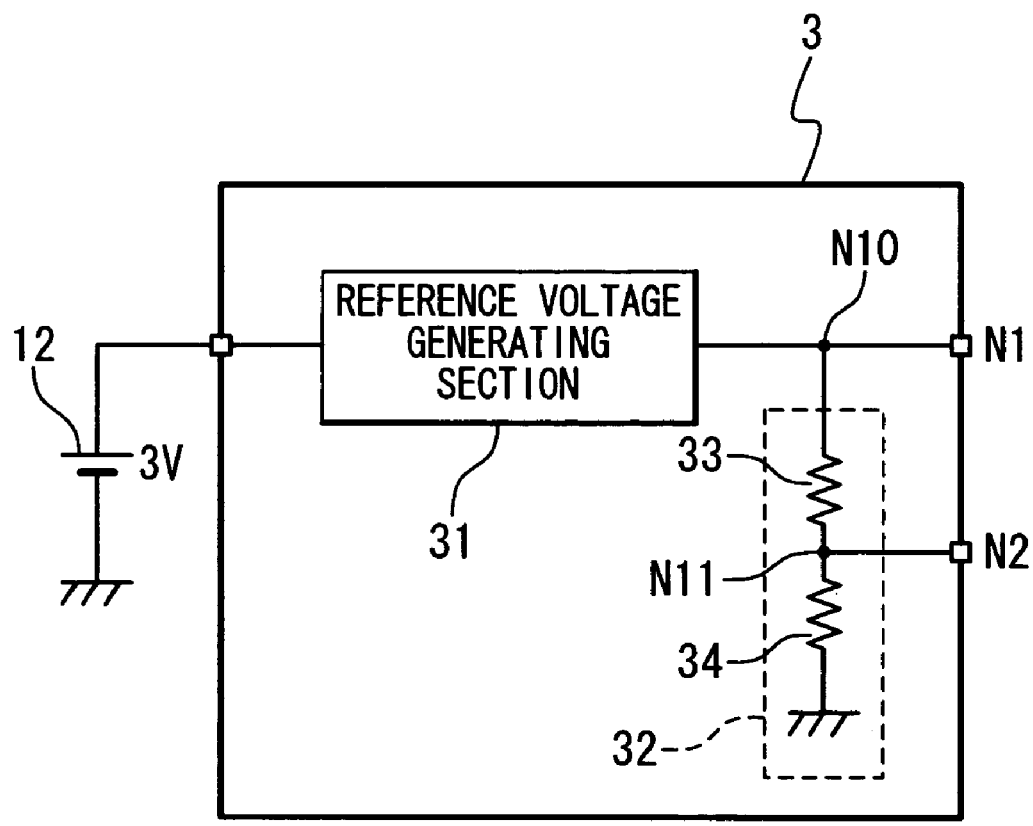
FIG. 7 is a circuit diagram showing a reference voltage generating circuit in the first embodiment.

The specific configurations of the reference voltage generating circuit 3, the amplifier circuit 4, and the AD conversion circuit 5 will be described below with reference to the drawings. FIG. 7 is a circuit diagram showing the specific configuration of the reference voltage generating circuit 3. As shown in FIG. 7, the reference voltage generating circuit 3 is configured to have a reference power supply voltage generation unit 31 and a sensor power supply voltage generation unit 32. The reference power supply voltage generation unit 31 is a voltage generating circuit for generating a voltage to be supplied to the AD conversion circuit 5. As shown in FIG. 7, the reference power supply voltage generation unit 31 is connected to a direct-current power supply 12. The reference power supply voltage generation unit 31 generates the reference power supply voltage Vref based on the voltage supplied from the direct-current power supply 12. The reference power supply voltage Vref outputted from the reference power supply voltage generation unit 31 is supplied to the sensor power supply voltage generation unit 32 through a node N10. As shown in FIG. 7, the sensor power supply voltage generation unit 32 is configured to have a first resistance 33 and a second resistance 34. The sensor power supply voltage generation unit 32 generates the sensor power supply voltage Vs through resistance division of the reference power supply voltage Vref by the first resistance 33 and the second resistance 34, and supplies the generated sensor power supply voltage to the pressure sensor 2 through the node N2. When the resistance value of the first resistance 33 is a resistance value R33 and the resistance value of the second resistance 34 is the resistance value R34, the sensor power supply voltage outputted from the sensor power supply voltage generation unit 32 is indicated by a formula shown below.

$$Vs = \{R34/(R33+R34)\} * Vref \quad (1)$$

As apparent from the equation (1), the voltage of the node N11 changes in correspondence to the change in the voltage of the node N10. Consequently, it is possible to configure the reference voltage generating circuit 3 for the sensor power supply voltage so as to be generated in correspondence to the change in the reference power supply voltage.

Here, there may be a case where the resistance values of the first resistance 33 and second resistance 34 change in accordance with external factors such as a temperature change. To deal with such a case, resistances whose relative accuracies are equal (equal in a ratio of resistance changes due to a temperature characteristic and so on) are used for the first resistance 33 and the second resistance 34. Consequently, even when the reference power supply voltage changes, the sensor power supply voltage can be generated in accordance with the change in the reference power supply voltage. For example, when the voltage supplied from the direct-current power supply 12 is 3V, the reference power supply voltage generation unit 31 generates the reference power supply voltage of 2.0V based on the power supply voltage of 3V. At the same time, it is assumed that the first resistance 33 and the second resistance 34 have the same resistance value. At this time, the voltage of the node N11 is 1.0V, as calculated from the equation (1). Thus, the reference voltage generating circuit 3 outputs the voltage of 2.0V as the reference power supply voltage, and outputs the voltage of 1.0V generated in the sensor power supply voltage generation unit 32 as the sensor power supply voltage.

Figure 8:
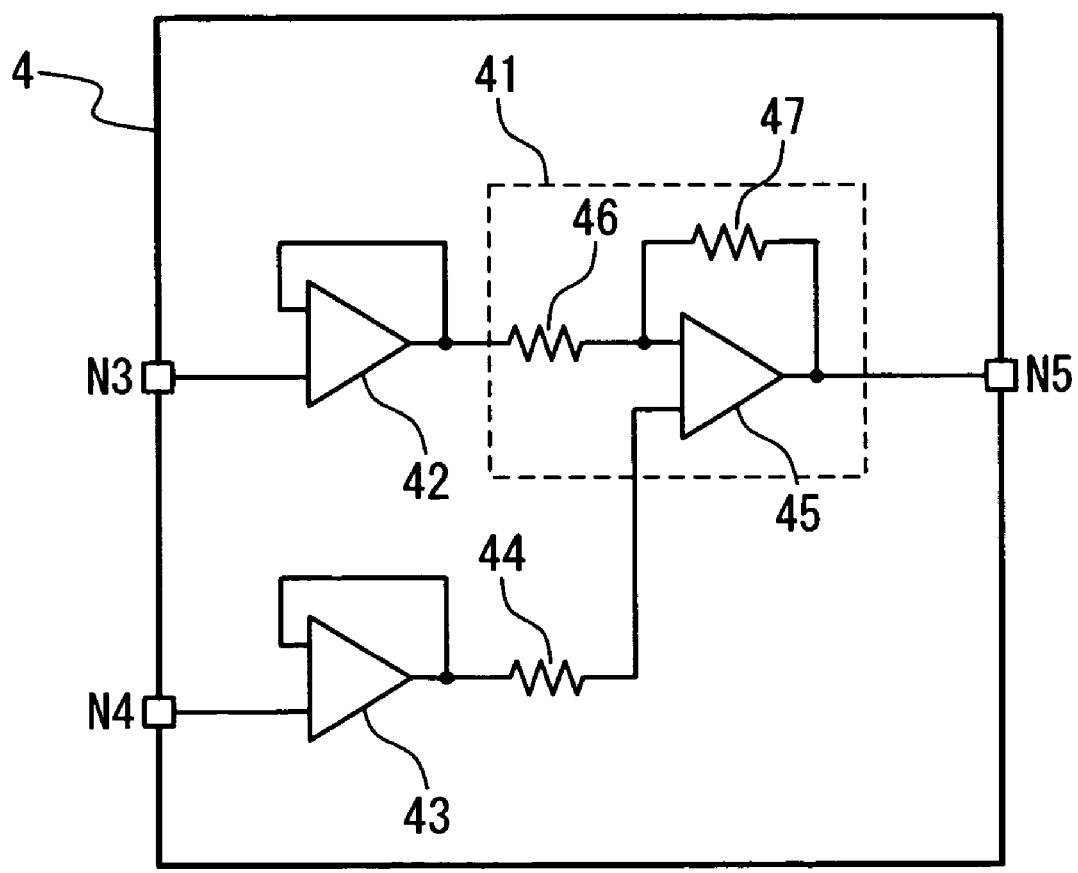
FIG. 8 is a circuit diagram showing an amplifying circuit in the first embodiment.

FIG. 8 is a circuit diagram showing the specific configuration of the amplifier circuit 4. As shown in FIG. 8, the amplifier circuit 4 is configured to contain an amplifier unit 41 and voltage followers 42 and 43. The amplifier unit 41 is further provided with an OP amplifier 45, an amplifier unit first resistance 46, and an amplifier unit second resistance 47. An amplification factor of the amplifier unit 41 is determined based on a ratio of the resistance value of the amplifier unit first resistance 46 and that of the amplifier unit second resistance 47. It is assumed in the following description that the amplifier unit 41 has the amplification factor of 30. The voltage signals supplied from the pressure sensor 2 are supplied to the voltage followers 42 and 43 through the nodes N3 and N4, respectively. Output of the voltage follower 42 is supplied to the OP amplifier 45 through the amplifier unit first resistance 46. In the same way, the output of the voltage follower 43 is supplied to the OP amplifier 45 through a resistance 44. The output of the OP amplifier 45 is connected to the node N5, and the amplifier unit 41 supplies the amplified signal to the AD conversion circuit 5 through the node N5.

Figure 9:
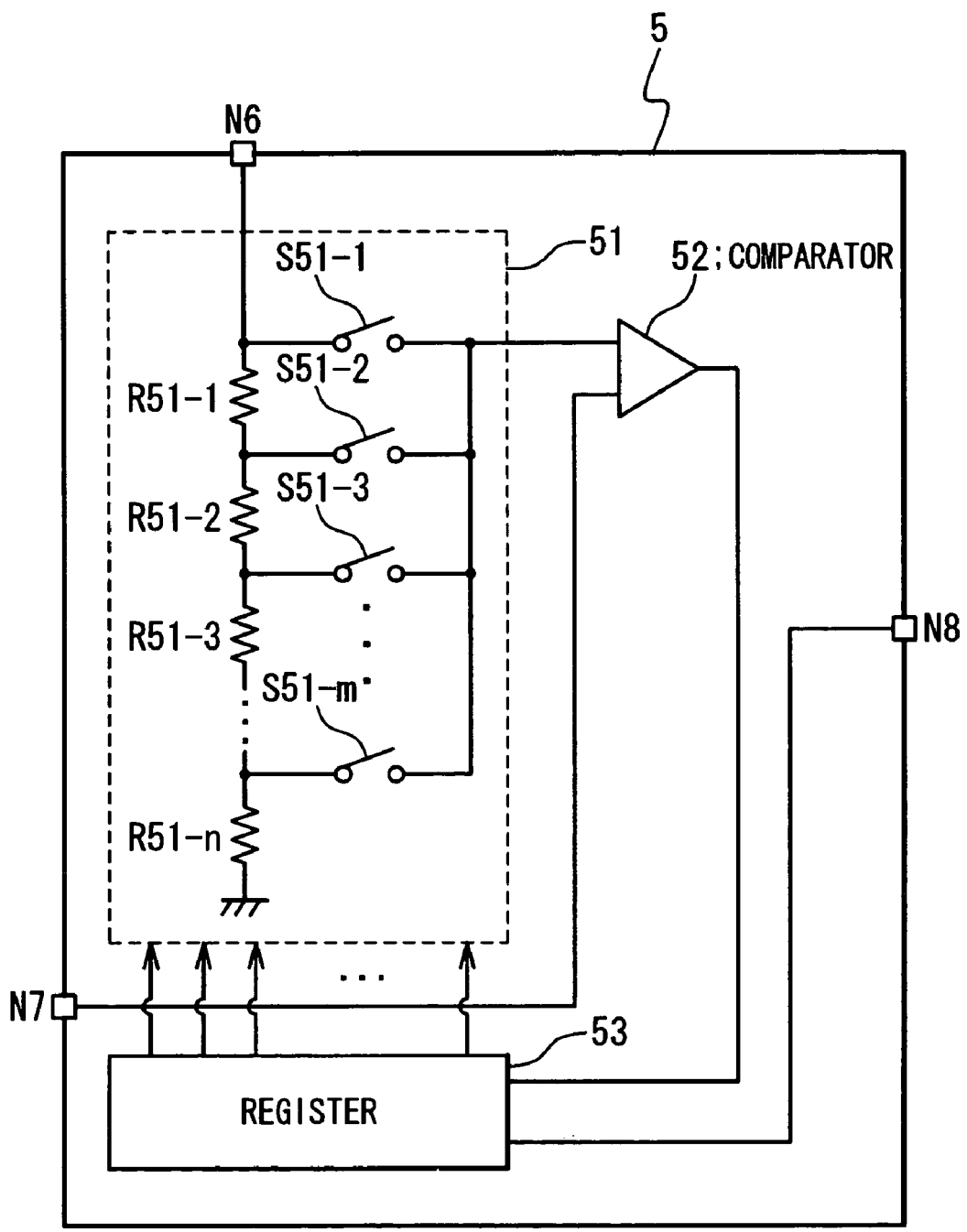
FIG. 9 is a circuit diagram showing an AD conversion circuit in the first embodiment.

FIG. 9 is a circuit diagram showing the specific configuration of the AD conversion circuit 5. As shown in FIG. 9, the AD conversion circuit 5 is configured to contain a voltage generation unit 51, a comparator 52, and a register 53. The AD conversion circuit 5 receives the amplification signal outputted from the node N5 through the node N7. The voltage generation unit 51 is supplied with the reference power supply voltage outputted from the reference voltage generating circuit 3 through the node N6. As shown in FIG. 9, the voltage generation unit 51 is provided with a plurality of resistances (R51-1~R51-n) connected in series, and a plurality of switches (S51-1~S51-m). The voltage generation unit 51 is a voltage generating circuit for performing voltage division to the reference power supply voltage Vref to generate a comparison voltage. The voltage generation unit 51 switches a plurality of switches (S51-1~S51-m) in response to a resister value of the register 53. The comparison voltage selected by the plurality of switches is supplied to the comparator 52. The comparator 52 compares a voltage of the amplification signal supplied through the node N7 and the comparison voltage supplied from the voltage generation unit 51, and outputs the comparison result to the register 53. The register 53 is a storage circuit for storing the AD conversion value (digital value) based on the state of the plurality of switches (S51-1~S51-m). The resister 53 stores the register value when the output signal outputted from the comparator 52 is inverted, as the AD conversion value that corresponds to the amplified voltage at that time. The digital value stored in the register 53 is read to the microcomputer 8 through the node N8.

The effects where the semiconductor device of the present invention is configured with the use of attached tables will be described below. Here, FIG. 10 is a table 70 showing an output value of the AD conversion circuit 5 where the circuit of the present invention is not configured. FIG. 11 is a table 80 showing the output value of the AD conversion circuit 5 where the circuit of the present invention is configured. Each numeric value in the table 70 of FIG. 10 and each numeric value in the table 80 of FIG. 11 both show the output when a constant pneumatic pressure is applied to the pressure sensor 2.

As shown in the table 70 of FIG. 10, when the circuit of the present invention is not configured and when the tire and the air inside the tire are at ordinary temperature (approximately 25° C.), it is preferable that the sensor power supply voltage 71 is 1.0V and the reference power supply voltage 72 is 2.0V (the state of typical in FIG. 10). Assuming that a sensor output voltage 73 of the pressure sensor 2 in this case is 10 mV, the amplification voltage (Vain) amplified by the amplifier circuit 4 and supplied to the AD conversion circuit 5 is 0.3V. At this time, the reference power supply voltage 72 supplied to the AD conversion circuit 5 is 2.0V. Therefore, the AD conversion value showing the conversion value "154" is outputted as an AD conversion value 75.

Here, if the reference power supply voltage 72 changes from 2.0V to 2.2V, the voltage of 2.2V is supplied to the AD conversion circuit 5 as the reference power supply voltage. At this time, the amplification voltage (Vain) supplied from the amplifier circuit 4 is 0.3V. As a result, the AD conversion value showing the conversion value "139" is outputted as the AD conversion value 75. In the same way, if the reference power supply voltage 72 changes from 2.0V to 1.8V, the voltage of 1.8V is supplied to the AD conversion circuit 5 as the reference power supply voltage. At this time, the amplification voltage (Vain) supplied from the amplifier circuit 4 is 0.3V. As a result, the AD conversion value showing the conversion value "171" is outputted as the AD conversion value 75. Thus, when the circuit of the present invention is not configured, a different output value is outputted if the reference power supply voltage changes, although the pressure applied to the pressure sensor 2 is constant.

As shown in the table 80 of FIG. 11, when the tire and the air inside the tire are at ordinary temperature (approximately 25° C.) in the circuit configuration of the present invention, it is preferable that a sensor power supply voltage 81 supplied to the pressure sensor 2 is 1.0V, and a reference power supply voltage 82 supplied to the AD conversion circuit 5 is 2.0V (the state of typical in FIG. 11). If a sensor output voltage 83 of the pressure sensor 2 in this case is 10 mV, the amplification voltage (Vain) amplified in the amplifier circuit 4 and supplied to the AD conversion circuit 5 is 0.3V. At this time, the reference power supply voltage 82 supplied to the AD conversion circuit 5 is 2.0V. As a result, the AD conversion value showing the conversion value "154" is outputted as an AD conversion value 85.

Here, if the reference power supply voltage 82 changes from 2.0V to 2.2V as shown in the table 80, the voltage of 2.2V is supplied to the AD conversion circuit 5 as the reference power supply voltage. At this time, the reference voltage generating circuit 3 generates the sensor power supply voltage in correspondence to the voltage changed to 2.2V.

As mentioned in the description of FIG. 7 mentioned above, the reference voltage generating circuit 3 of the present invention has the sensor power supply voltage generation unit 32, and generates the sensor power supply voltage by performing the resistance voltage division to the reference power supply voltage. Therefore, if the reference power supply voltage changes to 2.2V, the sensor power supply voltage generation unit 32 generates the sensor power supply voltage by performing the resistance voltage division to the voltage of 2.2V. As shown in the table 80, a voltage division ratio of the sensor power supply voltage generation unit 32 is 0.5. Therefore, the sensor power supply voltage 81 of 1.1V is outputted from the sensor power supply voltage generation unit 32, when the reference power supply voltage shifts to 2.2V.

If the sensor power supply voltage 81 of 1.1V is supplied to the pressure sensor 2, the pressure sensor 2 outputs 11 mV as the sensor output voltage 83. In the sensor of a bridge shape, the voltage to be outputted is proportional to the power supply voltage supplied to the sensor. Consequently, if the power supply voltage supplied to the pressure sensor 2 is increased by 10%, the output voltage is also increased by 10%. The amplifier circuit 4 amplifies the voltage signal of 11 mV, and supplies the amplification voltage (Vain) of 0.33V to the AD conversion circuit 5. Here, the AD conversion circuit 5 is supplied with the reference power supply voltage of 2.2V as mentioned above. The AD conversion circuit 5 carries out the AD conversion as indicated by the following equation (2), based on the reference power supply voltage of 2.2V and the amplification voltage (Vain) supplied from the amplifier circuit 4. As mentioned above, the AD conversion circuit 5 in this embodiment has the solution levels of 10 bits ($2^{10}$=1024). Therefore, the AD conversion value when an input voltage equal to the reference power supply voltage Vref is supplied to the AD conversion circuit 5, is indicated to be 1024 in a decimal number. Also, the AD conversion value (decimal number) corresponding to the amplification voltage Vain to be inputted can be obtained from the following equation (2).

$$\begin{aligned}Vain/Vref * 1024 &\\ &= 0.33\,\text{V}/2.2\,\text{V} * 1024 \\ &= 0.15 * 1024 \\ &= 154\end{aligned} \qquad (2)$$

Thus, the AD conversion circuit 5 outputs the AD conversion value showing the conversion value "154" as the AD conversion value 85.

Figure 12:
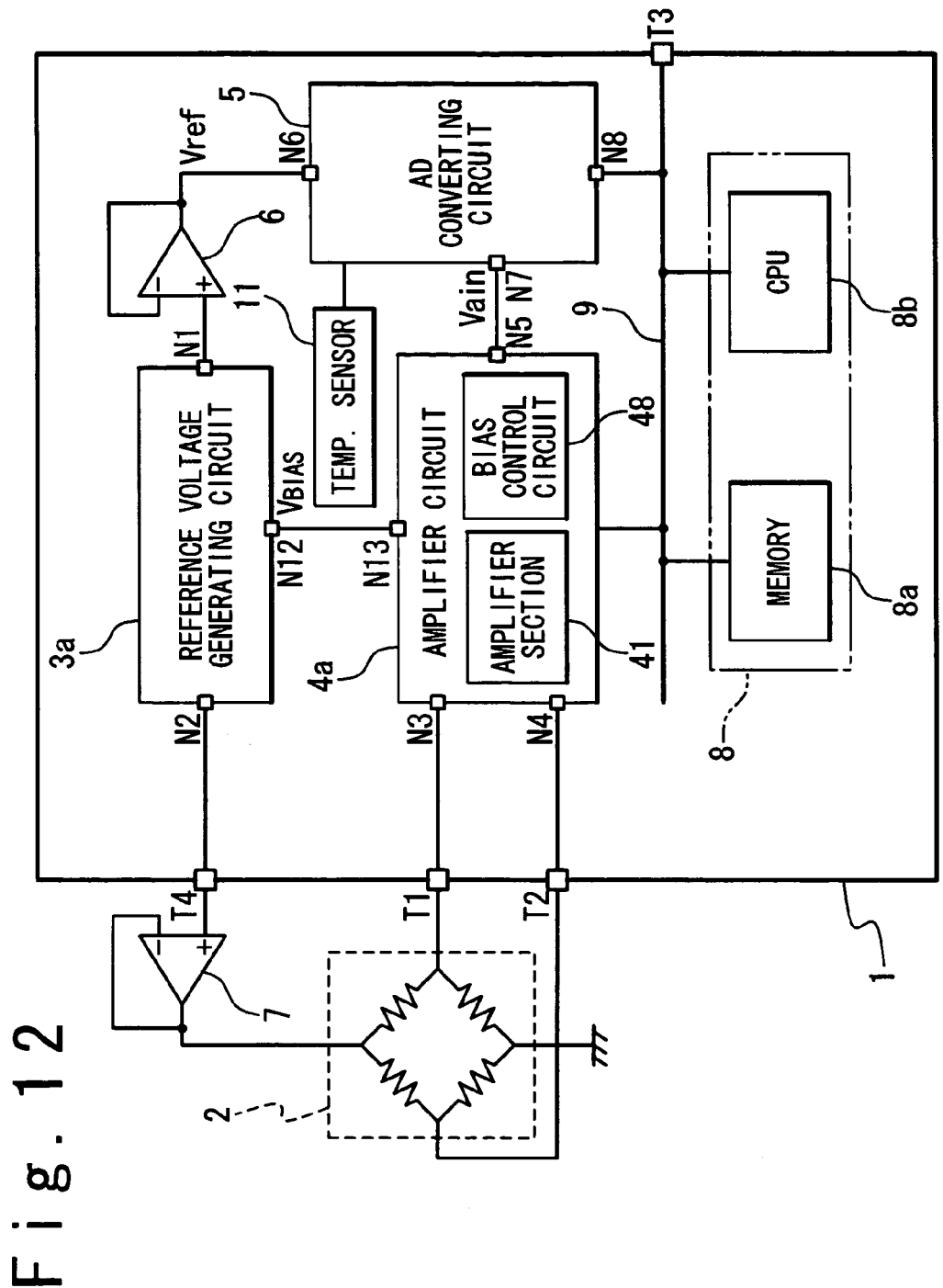
FIG. 12 is a block diagram showing the semiconductor device according to a second embodiment of the present invention.

Similarly, if the reference power supply voltage changes from 2.0V to 1.8V, the voltage of 1.8V is supplied to the AD conversion circuit 5 as the reference power supply voltage. At this time, the reference voltage generating circuit 3 performs the resistance voltage division to the voltage of 1.8V to generate the voltage of 0.9V as the sensor power supply voltage. The pressure sensor 2 outputs the voltage of 9 mV as the sensor output voltage 83, if being supplied with the voltage of 0.9V. The amplifier circuit 4 amplifies the voltage of 9 mV, and generates the amplification voltage (Vain) of 0.27V to supply to the AD conversion circuit 5. At this time, the AD conversion circuit 5 carries out the AD conversion as indicated by the following equation (3), based on the reference power supply voltage of 1.8V supplied from the reference voltage generating circuit FIG. 12 is a block diagram showing a configuration of the semiconductor device in the second embodiment. Here, the same components in the second embodiment as in the first embodiment are allocated with the same reference numerals. Thus, the detailed description of the components is omitted. In the embodiment below, an operation for controlling the output of an amplifier circuit 4a is mainly described, which is equivalent to whole control of an input offset to the amplifier circuit 4a.

As shown in FIG. 12, the semiconductor device 1 in the second embodiment is configured to contain an amplifier circuit 4a for amplifying the output from the pressure sensor 2. The amplifier circuit 4a is further provided with a bias control circuit 48 and a node N13. The bias control circuit 48 is a control circuit for variably controlling an amplification signal (Vain) to be outputted to an AD conversion circuit 5, in response to a control signal supplied from the microcomputer 8. Also, a reference voltage generating circuit 3a in the second embodiment is provided with a node N12. The reference voltage generating circuit 3a supplies a predetermined bias voltage VBIAS to the amplifier circuit 4a through the node N12. The amplifier circuit 4a receives the bias voltage VBIAS outputted from the reference voltage generating circuit 3a through the node N13, to supply 3 and the amplification voltage (Vain) of 0.27V supplied from the amplifier circuit 4.

$$Vain/Vref * 1024 \quad (3)$$
$$= 0.27 \text{ V}/1.8 \text{ V} * 1024$$
$$= 0.15 * 1024$$
$$= 154$$

Thus, in this case too, the AD conversion circuit 5 outputs the AD conversion value showing the conversion value "154" as the AD conversion value 85. As indicated by the above equations (2) and (3), it is possible to obtain a correct output value even when the reference power supply voltage changes, by providing the circuit of the present invention. Therefore, it is possible to obtain a sensor output result that is reliable, by configuring the semiconductor device of the present invention. Additionally, although the description is given on the assumption that the division ratio of the resistance voltage division of the sensor power supply voltage generation unit 32 is 0.5 in the embodiment mentioned above, this does not limit the voltage division ratio in the present invention.

Second Embodiment

The semiconductor device according to the second embodiment of the present invention will be described with reference to the attached drawings. to the bias control circuit 48. Further, the microcomputer 8 in the second embodiment is configured to have a memory 8a and a CPU 8b. Description is given on the assumption that the memory 8a in the embodiment is a RAM (Random Access Memory) This does not limit the memory 8a in the present invention. For example, it is also possible to form the memory 8a by a nonvolatile memory such as an EEPROM. The CPU 8b outputs the control signal to the amplifier circuit 4a based on data stored in the memory 8a. Specific circuit configurations of the amplifier circuit 4a and the reference voltage generating circuit 3a are described later.

Figure 13:
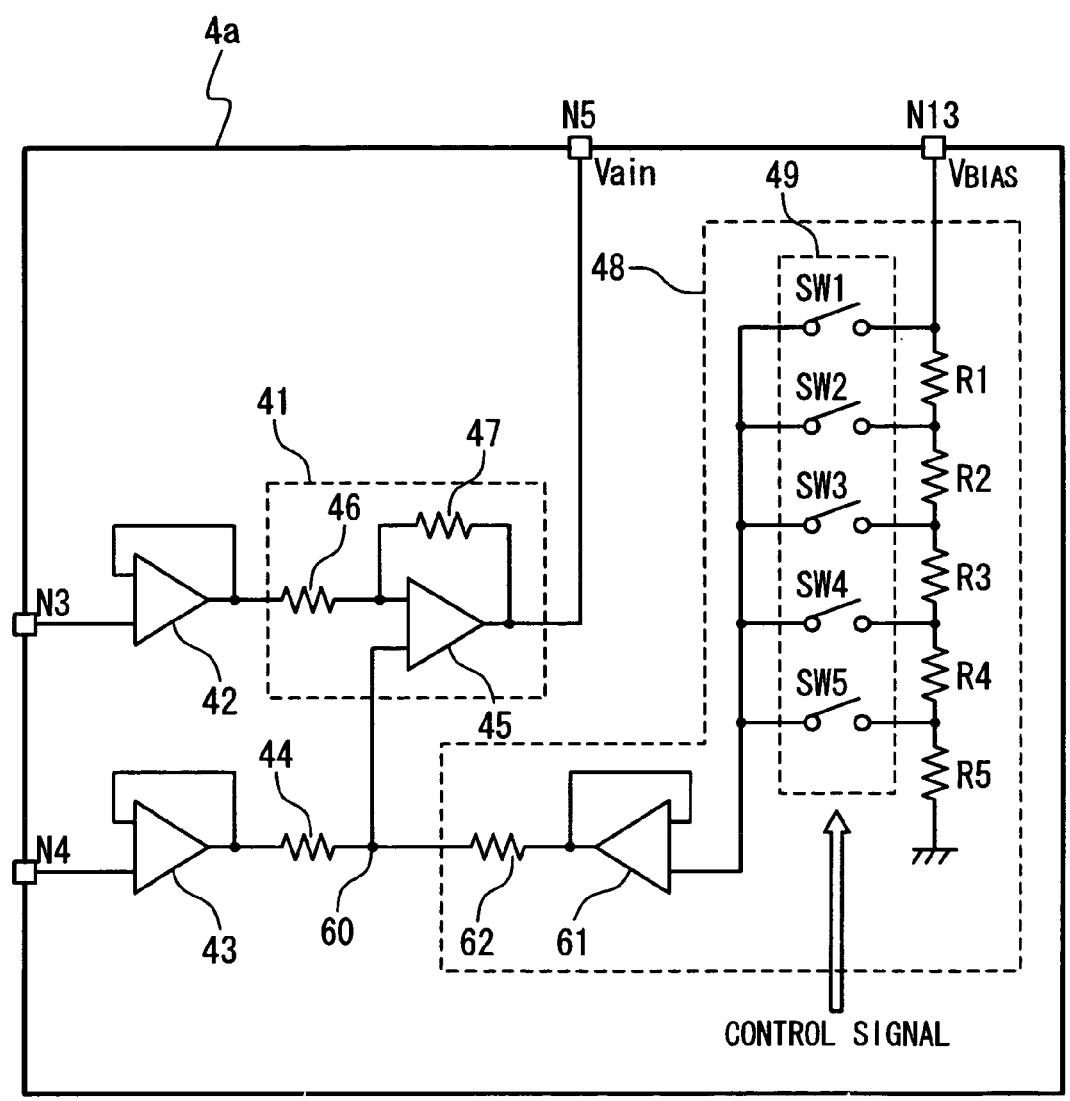
FIG. 13 is a circuit diagram showing the amplifying circuit in the second embodiment.

FIG. 13 is a circuit diagram showing the configuration of the amplifier circuit 4a in the second embodiment. An amplifier unit 41 shown in FIG. 13 is configured to have a bias control circuit 48 in addition to the amplifier circuit 4 mentioned in the first embodiment. As shown in FIG. 13, the bias control circuit 48 is configured to have a switch group 49 of a plurality of switches (SW1~SW5), a plurality of resistances (R1~R5), a voltage follower 61, and a resistance 62. The switch group 49 changes a switching state of each of the plurality of switches (SW1 to SW5) based on the control signal mentioned above. The bias control circuit 48 generates a desired bias voltage by closing an optional switch among the switch group 49, in response to the control signal. The bias voltage is supplied to a node 60 through the voltage follower 61. The amplifier circuit 4a can change the output of the amplifier unit 41 a step by a step by switching the switch group 49. At this time, by generating the bias voltage VBIAS supplied from the node N13 based on the reference power supply voltage supplied to the AD conversion circuit 5, a variation of the AD conversion value due to the switching can be kept constant regardless of a variation in the reference power supply voltage (due to a temperature change and so on).

Figure 14:
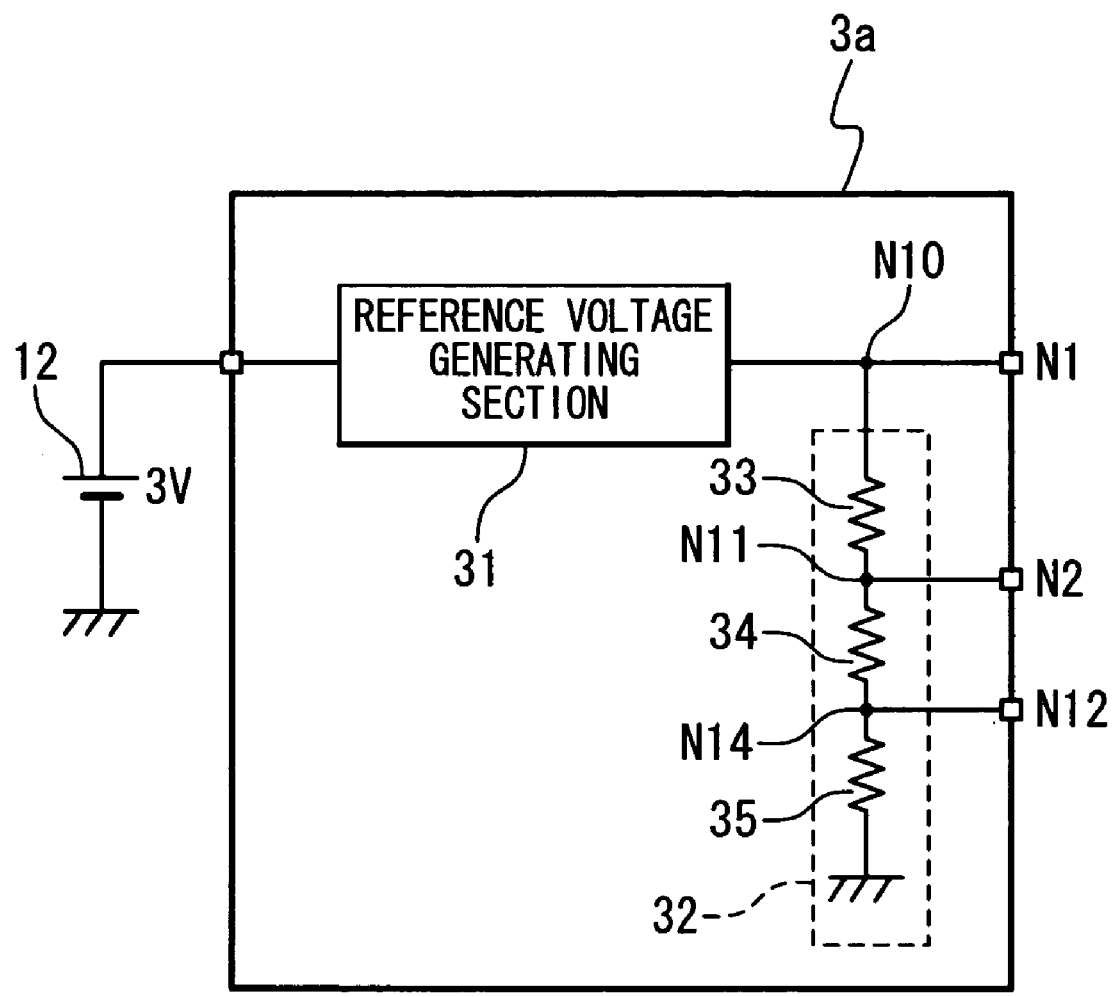
FIG. 14 is a circuit diagram showing a reference voltage generating circuit in the second embodiment.

FIG. 14 is a circuit diagram showing a configuration of the reference voltage generating circuit 3a in the second embodiment. As shown in FIG. 14, the reference voltage generating circuit 3a in the second embodiment is configured to contain a third resistance 35 and the node N12 in addition to the reference voltage generating circuit 3 described in the first embodiment. The respective resistance values of the first resistance 33, second resistance 34, and third resistance 35 of the reference voltage generating circuit 3a is specified such that a desired voltage can be obtained. Even when the reference power supply voltage varies, the voltage corresponding to the variation (sensor power supply voltage, bias voltage) can be outputted by forming the reference voltage generating circuit 3a as described above and supplying the bias voltage VBIAS to the bias control circuit 48 of the amplifier circuit 4a. Consequently, it is possible to obtain a sensor output result that is more reliable in correspondence to the first embodiment without providing a power supply circuit of high accuracy.

The case where the semiconductor device of the present invention is applied to the TPMS has been described. However, this does not mean that the present invention is applicable only to the TPMS. Also, it is possible to combine a plurality of the embodiments mentioned above to be implemented, to the extent that a discrepancy is not generated.

According to the present invention, the semiconductor device for carrying out the AD conversion based on the reference power supply voltage can be formed, which can convert the analog data into the digital data without being affected by the voltage variation even when the reference power supply voltage varies.

What is claimed is:

1. A semiconductor device comprising:
   a reference voltage generating section configured to generate a first reference voltage and a second reference voltage based on a voltage supplied from an external power supply; and
   an AD (analog/digital) conversion circuit operating based on said first reference voltage to generate an AD conversion signal corresponding to an output signal supplied from an external device,
   wherein said second reference voltage is supplied to said external device, and
   a ratio of said first reference voltage and said second reference voltage is kept to a constant value regardless of a temperature of said semiconductor device.

2. The semiconductor device according to claim 1, wherein said reference voltage generating section comprises:
   an internal reference voltage generating circuit configured to generate said first reference voltage based on the voltage supplied from said external power supply; and
   an external reference voltage generating circuit configured to generate said second reference voltage from said first reference voltage such that the ratio is kept.

3. The semiconductor device according to claim 1, further comprising an amplifying circuit provided between said external device and said AD conversion section and configured to amplify the output signal supplied from said external device to output an amplification signal,
   wherein said AD conversion circuit carries out the AD conversion to said amplification signal based on said second reference voltage to generate the AD conversion signal.

4. The semiconductor device according to claim 3, wherein, said reference voltage generating section further generates a third reference voltage from said first reference voltage, and
   said amplifying circuit comprises:
   an operational amplifier; and
   a bias control circuit configured to apply a bias voltage to an input terminal of said operational amplifier based on said third reference voltage in response to a control signal.

5. The semiconductor device according to claim 1, wherein said reference voltage generating section comprises two voltage follower circuits configured to supply said first and second reference voltages to said AD conversion circuit and said external device, respectively.

6. The semiconductor device according to claim 1, further comprising:
   a microcomputer configured to temporarily store the AD conversion signal and output the AD conversion signal as a digital data signal.

7. A data communication apparatus comprising:
   a sensor; and
   a semiconductor device configured to generate a digital data signal based on an output signal which is outputted from said sensor,
   wherein said semiconductor device comprises:
   an amplifying circuit configured to amplify the output signal outputted from said sensor to generate an amplification signal;
   an AD (analog/digital) conversion circuit configured to carry out AD conversion to the amplification signal from said amplifying circuit to generate an AD conversion signal;
   a microcomputer configured to generate said digital data signal based on the AD conversion signal; and
   a reference voltage generating section configured to generate first and second reference voltages from a voltage supplied from a power supply, and to supply said first and second reference voltages to said AD conversion circuit and said sensor, and a ratio of said first reference voltage and said second reference voltage is kept to be constant regardless of a temperature of said semiconductor device.

8. The data communication apparatus according to claim 7, wherein said reference voltage generating section comprises:
   an internal reference voltage generating circuit configured to generate said first reference voltage based on the voltage supplied from said power supply; and
   an external reference voltage generating circuit configured to generate said second reference voltage from said first reference voltage such that the ratio is kept.

9. The data communication apparatus according to claim 7, wherein said reference voltage generating section further generates a third reference voltage from said first reference voltage, and
   said amplifying circuit comprises:
   an operational amplifier; and
   a bias control circuit configured to apply a bias voltage to an input terminal of said operational amplifier based on said third reference voltage in response to a control signal.

10. A vehicle having tires, comprising:
    a data communication unit provided for at least one of the tires; and
    a control unit configured to receive a pneumatic pressure data transmitted from said data communication unit,
    wherein said data communication unit comprises:
    a pressure sensor configured to detect pneumatic pressure of a tire to generate a sensor signal;
    a semiconductor device configured to generate the pneumatic pressure data based on the sensor signal outputted from said pressure sensor,
    wherein said semiconductor device comprises:
    an amplifying circuit configured to amplify the sensor signal outputted from said pressure sensor to generate an amplification signal;
    an AD (analog/digital) conversion circuit configured to convert the amplification signal from said amplifying circuit into an AD conversion signal;
    a microcomputer configured to generate the pneumatic pressure data based on the A/D conversion signal and transmit the pneumatic pressure data to said control unit; and
    a reference voltage generating circuit connected with said AD conversion circuit and configured to generate a basic reference voltage for a reference voltage, a reference voltage generating section configured to generate first and second reference voltages from a voltage supplied from a power supply, and to supply said first and second reference voltages to said AD conversion circuit and said pressure sensor, and a ratio of said first reference voltage and said second reference voltage is kept to be constant regardless of a temperature of said semiconductor device.

11. The vehicle according to claim 10, wherein said reference voltage generating section comprises:

an internal reference voltage generating circuit configured to generate said first reference voltage based on the voltage supplied from said power supply; and an external reference voltage generating circuit configured to generate said second reference voltage from said first reference voltage such that the ratio is kept.

12. The vehicle according to claim 10, wherein said reference voltage generating section further generates a third reference voltage from said first reference voltage, and said amplifying circuit comprises:

an operational amplifier; and a bias control circuit configured to apply a bias voltage to an input terminal of said operational amplifier based on said third reference voltage in response to a control signal.

* * * * *